Figure 1:
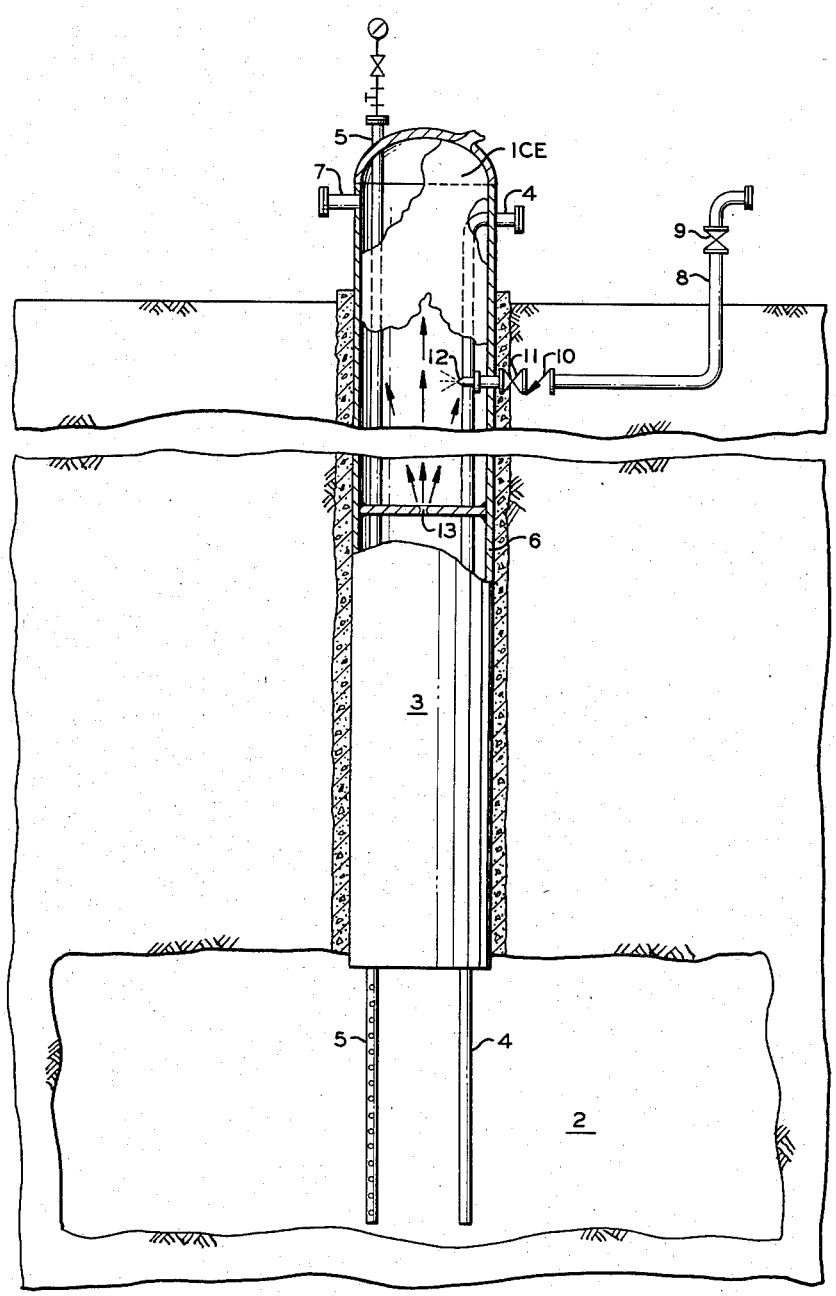

Feb. 14, 1961 L. P. MEADE 2,971,344
METHOD OF SEALING OFF FLOW FROM UNDERGROUND
STORAGE CAVERN AND APPARATUS
Filed Jan. 31, 1958 2 Sheets-Sheet 1

INVENTOR.
L. P. MEADE
BY
*Hudson & Young*
ATTORNEYS

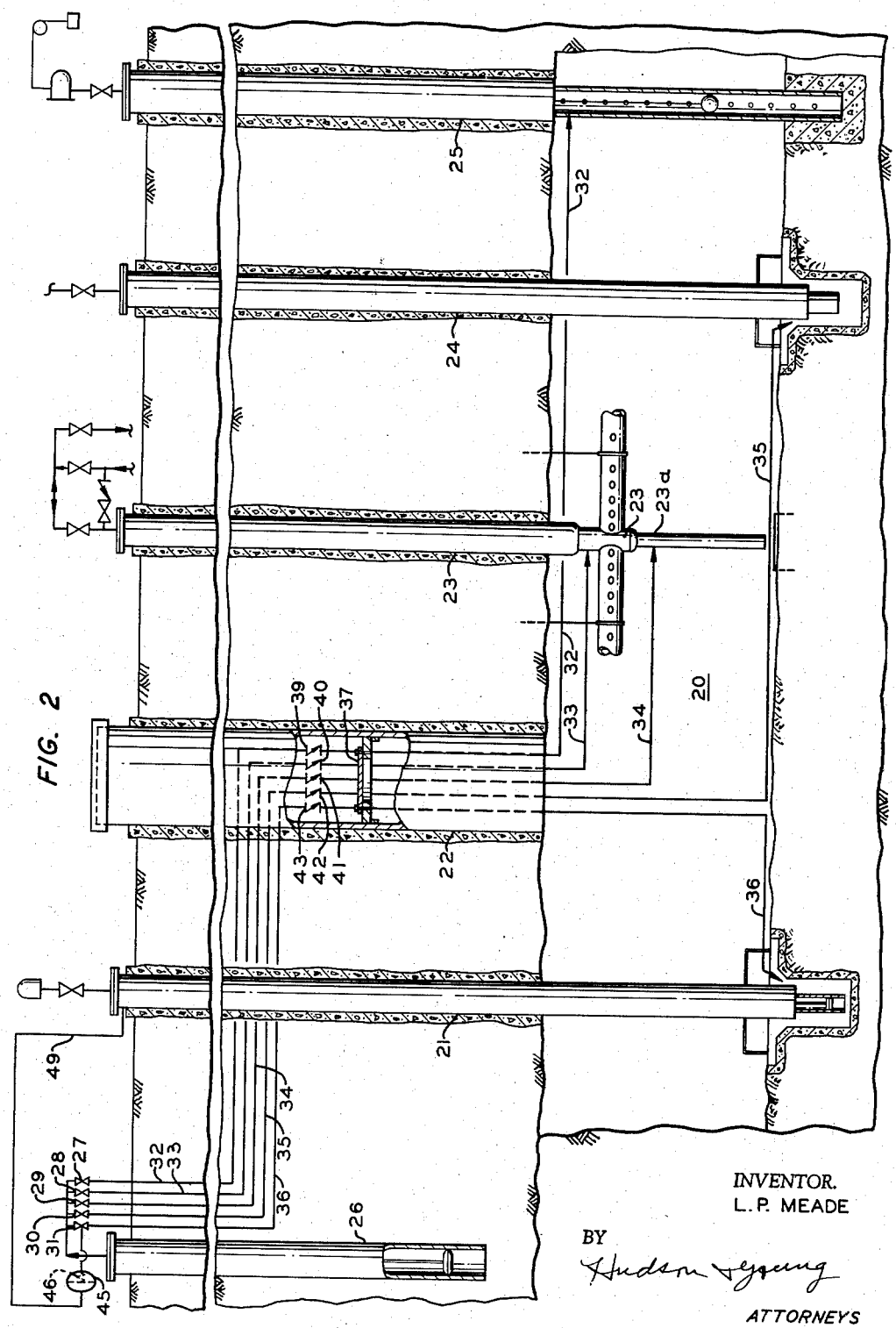

United States Patent Office 2,971,344
Patented Feb. 14, 1961

2,971,344
METHOD OF SEALING OFF FLOW FROM UNDERGROUND STORAGE CAVERN AND APPARATUS

Leonard P. Meade, Bartlesville, Okla., assignor to Phillips Petroleum Company, a corporation of Delaware Filed Jan. 31, 1958, Ser. No. 712,519

18 Claims. (Cl. 62—48)

This invention relates to the underground storage of gaseous materials. In one of its aspects the invention relates to the provision of a safety feature in an underground storage cavern or cavity or reservoir in which liquefied petroleum gas is stored and from which said gas might escape uncontrollably in the event that surface installations or piping were broken or otherwise became unable to contain the said gases under their existing pressure, the safety feature consisting of, broadly, supplying water into the conduit or pipe connecting the reservoir and a point at or near ground level. In another of its aspects the invention relates to a method for preventing the escape of gases such as hydrocarbon gases, which are stored in an underground cavity or reservoir, when there is a break in piping and/or valving or other equipment at the surface which is connected to and in communication with the inside of said reservoir by supplying water into said pipe or piping which connects the inside of the reservoir with a point at the ground level at a point of said pipe or piping which is between said reservoir and the break therein. In a further aspect of the invention, method and apparatus are set forth providing for the feeding of sealing fluid into a conduit connecting underground reservoir containing, say, liquefied petroleum gases, and a point at or near ground level whenever there is a break in said conduit in a manner and under conditions such that the hydrostatic head of the sealing fluid which is formed or an ice plug which also can be formed will seal off flow of gases from the reservoir.

The underground storage of gases such as liquefied, normally gaseous hydrocarbons is well known in the art. This storage can be accomplished in natural cavities such as solution mined salt cavities or in mechanically mined caverns. An underground storage system to which the invention relates will ordinarily comprise certain servicing pipes or piping, valving, pumps, etc. At or near the location of the underground cavity there will usually be found on the surface piping, valving, and other equipment which are subject to damage due to external forces which may bear upon them. Thus, objects can fall from the sky, explosions may occur and even fires which would damage the installations at or near ground level can also occur. Other causes may contribute to failure of an otherwise solidly constructed portion of equipment which is necessary to the operation of an underground storage reservoir.

According to the present invention there have been conceived a method and apparatus for sealing off at a point between the surface, where a break might have occurred, and the reservoir cavity any conduit which when said break would occur would allow uncontrollable flow of gases and/or liquid from the underground storage cavity, the sealing off being effected in one form of the invention by pumping water into said conduit under such conditions and in a manner as to provide a hydrostatic head sufficiently great to prevent the flow of gas and/or liquid from said reservoir through said break and in another form thereof, by pumping water or congealable fluid into said conduit in a manner and under conditions such that the refrigeration due to expansion of the gases flowing therethrough will congeal or freeze, thus plugging the conduit.

Since this invention is one which partakes essentially of a physical character, one skilled in the art in possession of this disclosure, can readily determine by mere routine tests the various sealing fluids or materials which can be applied thereto. The invention is exemplified with the use of water. Similarly, the invention is exemplified as it relates to the storage of socalled LPG or liquefied petroleum gases.

It is within the scope of the invention to apply the same to the underground storage of gases which are not liquefied hydrocarbon gases or petroleum gases and to employ sealing fluids which are other than water.

Thus, a principal object of this invention is to provide a safety shut off or sealing means and method in combination with an underground storage system or reservoir, which is adapted to the storage of liquefied petroleum and other gases. It is another object of this invention to provide such a safety shut off as herein described which makes use of the refrigeration effect which is obtainable when gases expand from an underground storage system when said gases flow uncontrollably when there has been a break in surface installation or piping. Still a further object of the invention is to provide such a safety method and apparatus as herein set forth and described wherein the sealing which is to be effected is accomplished entirely automatically.

Referring now to the drawings, Figure 1 is a schematic illustration of an embodiment of the invention wherein there is provided an orifice plate within a conduit which is shown as having been ruptured or broken at a top portion thereof. Figure 2 is a diagrammatic illustration of another embodiment of the invention wherein there are shown several servicing lines or conduits as these coact with a cavern. Both figures show sealing fluid injection pipes. Figure 2 shows one manner in which the sealing fluid valve, or valves, can be operated automatically upon occurence of a break, as more fully set forth and described herein.

Referring now to Figure 1 of the drawings, 2 denotes a cavern for the storage of liquefied petroleum gases. This cavern is about 30 feet in depth and the top wall or roof of the cavern is about 265 feet below the surface of the ground. Connection with a point above the ground is made through shaft 3 in which there are enclosed pipes 4 and 5. Shaft 3 contains a liner 6 which is completely sealed from the atmosphere but which is in open communication with the cavern. Pipe 4 acts as a liquid seal or withdrawal pipe and, therefore, extends substantially to the bottom of the cavern. Pipe 5 contains a liquid level gauge mechanism for measuring the liquid level in the cavern. Pipe 7 is a vapor connection pipe through which vapor can be withdrawn as desired. Pipe 8 is a water supply line through which water will flow when valve 9 is open. Check valve 10 and block valve 11 are provided for operational purposes. Spray nozzle 12 will spray water into shaft 3 whenever valves 9 and 11 are open. Ordinarily, block valve 11 is maintained in open position. Orifice plate 13 is shown with only one opening. It is clear that in lieu of orifice plate 13 as shown there can be employed a plate having a plurality of holes. Other apparatus can be provided to cause a pressure drop whenever there is abnormal vapor flow up through shaft 3. In operation, it will be seen that as the rupture shown at the top of shaft 3 occurs vapor will rush upwardly through shaft 3 through the hole in orifice 13 and will escape through the rupture or other break. When a rupture has occurred valve 9 is opened and water under pressure, greater than that which prevails in shaft 3 will spray water into shaft 3. Due to the refrigeration effect of the expanding vapors, coming from the cavern, and passing through the orifice plate 13, ice will begin to form and to deposit in shaft 3 until finally shaft 3 is sealed against leakage through the rupture, substantially as shown.

Referring now to Figure 2, there is shown a cavern 20. This cavern is equipped with pumping unit 21, shaft 22, fill and compressor withdrawal means 23, spare vent 24, and vapor connection and gauge well 25. Water is supplied from water well 26 by way of valves 27–31, inclusive, and pipes 32–36, inclusive, to various points of elements 21, 23, 24, and 25, as shown. It will be noted that no water pipe connects with shaft 22. However, it will be noted that shaft 22 contains manway 37 and, therefore, in this embodiment, rupture above the manway will not allow escape of gases. Each of pipes 32–36, inclusive, is equipped with a flow check valve as shown at 39–43, inclusive.

For sake of simplicity only one automatic water valve control is shown. It will be understood that such automatic valve control can be arranged for each of the valves 27–31, inclusive, as each of these would be operated, respectively, responsive to a break in any one of conduits or elements 21, 23, 24 and 25. As shown, valve 31 is operated by a diaphragm 45. Spring 46 urges valve 31 to an open position. The upper portion of diaphragm 45 is connected to the top of element 21 by a pipe 49. Thus, when the cavern is filled or partially filled with liquefied petroleum gas, or other fluid under pressure, the pressure in the top of element 21 will be conducted via pipe 49 to the top of diaphragm 45. This pressure on the top of diaphragm 45 will overcome the force of spring 46 to hold valve 31 in the closed position. It is to be understood that the size of diaphragm 45 and strength of spring 46 will be so chosen as to permit closing of valve 31 under the conditions just described. Assuming a break somewhere near the top of element 21, or even in pipe 49, the pressure therein will suddenly drop by a considerable amount. Upon a reduction in pressure in the top of diaphragm 45, spring 46 will urge valve 31 to the open position. Each of the remaining water valves, as earlier noted, can be similarly equipped as is valve 31. In lieu of the fluid pressure actuated diaphragm 45, it is obvious that an electric or hydraulic mechanism could be employed. However, the diaphragm will usually be the most convenient and will not require an outside source of power and will, therefore, be the preferred embodiment.

Element 21 contains a deep well pump and assuming a break at or near the top thereof, it will be understood that the pressure in the cavern will cause upward flow of the liquid from the cavern through the break. At such time water will travel by way of pipe 36 into the pump sump and will be caused by the pressure in the cavern to travel upwardly through conduit 21. As soon as a sufficient column of water has been pushed into pipe or conduit 21, it will balance the pressure in the cavern and flow upwardly through 21 will have ceased. Similarly, water supplied through pipe 35 through the spare vent sump will seal element or conduit 24 whenever a break occurs at or near the ground level. Pipe 34 injects water below the spray header which is attached in open communication with conduit 23 into conduit 23a which is concentrically disposed in conduit 23. Pipe 33 injects water into conduit 23. If the break occurs in manner to open up uncontroled flow through the annulus between pipes 23a and 23, water which will be injected by way of pipe 33 will act not only by way of hydrostatic head but also by way of freezing a plug into the annulus since the flow of the vapors through the spray header will cause expansion and, therefore, refrigeration. In the event that both pipes 23 and 23a are broken, water will be injected at both places and the refrigeration in the annulus will cause the column of water being formed in pipe 23a to be frozen. Pipe 32 similarly supplies water to conduit 25 in which, as shown, there is a float type gauge.

At all times there is maintained a water pressure and water supply such that all of the places to which water might conceivably be pumped will receive sufficient quantities under a pressure which sufficienly exceeds that of the gases in the cavern that water will flow into the places through which stored gases would tend to escape.

It will be understood by one skilled in the art in possession of this disclosure and its specific example that many auxiliary elements and details, including other usual safety features, have been omitted for sake of simplicity. Suffice to say, one skilled in the art in possession of this disclosure now has a sufficient description of the concept of the invention and modes of carrying it into practice that he can adapt the same to his particular storage system.

It will be understood by one skilled in the art in possession of this disclosure that while the exemplification is made with respect to storage of petroleum gases other fluids which may be of a dangerous or of a valuable non-dangerous type can be stored in a system according to the present invention.

Whenever an ice plug has been frozen into position in a conduit according to this invention and repairs cannot be immediately made and it is desired to maintain the plug in frozen condition auxiliary refrigeration, which in one embodiment of the invention is effected by expanding gases from the cavern, can be supplied to maintain the plug in its frozen condition.

In an embodiment of the invention the orifice can be made variable at will so that its size can be adjusted, by remote control, or otherwise, to obtain refrigeration desired regardless of the size of the rupture.

As sealing fluids, there can be adapted to the invention among others, the following: muds, such as drilling muds, various cements such as quick-setting Portland cement or gypsum cements and even plastics or resins which can be diluted with adaptable solvents.

Other aspects, objects and the several advantages of the invention are apparent from study of this disclosure, the drawings, and the appended claims.

The invention is also applicable to cases in which a normally operative shutoff device at or near the surface becomes inoperative to retain the gases in the cavity.

In the foregoing described embodiment consider a cavern with its roof located at a distance of 265 feet below the surface of the ground, the floor of the cavern at a depth of 295 feet, a temperature of 60° F. within the cavern, the cavern half full of liquid propane and a pressure within the vapor space of 90 p.s.i.g. The pressure exerted at the floor of the cavern by the weight of the liquid propane and the pressure of the vapor above it will be approximately 92.6 p.s.i.g. A break occurs in the surface connections of pipe 21 which is 6" in diameter. This break will leak an amount of gas equal to the total flow capacity of the pipe or approximately 300 gallons per minute of the stored product. Valve 31 is opened automatically, or manually, and water is pumped through line 36 to the sump surrounding the lower end of pipe 21. Because water is heavier than the liquid propane, the water will flow by gravity to the bottom of the sump and the pressure of the propane acting on the water will force it upwards inside pipe 21 until a condition of static equilibrium is reached. That is, the pressure of the column of water in pipe 21 will be equal to the pressure exerted by the stored product at the base of the cavern. Since this pressure is 92.6 p.s.i.g., the column of water will stand 214 feet above the floor of the cavern. Since the pipe is 6" in diameter, the minimum amount of water required to control leakage of product occasioned by the break will be an amount equal to that required to fill the water supply pipe, if empty, plus the amount required to fill the sump and the 6" pipe to the equilibrium level. Assuming a 3" diameter supply pipe 1500 feet long, a sump capacity of 100 gallons and 214 feet of 6" pipe to be filled, then a total of 991 gallons of water would be required for a minimum amount. Total elapsed time to control leakage from the break will be 3.3 minutes if water is pumped at a rate of 300 gallons per minute. Obviously, this time will be greatly shortened if the water supply pipe is already full of water. Also the period may be lengthened somewhat if some of the introduced water is carried out of pipe 21 by the gases being discharged through the pipe. However, under most circumstances, uncontrolled escape of stored product should not continue for more than about 4 minutes after water is started into pipe 36.

The refrigeration effect of expanding propane vapors can be used to stop flow of product from a float gauge well such as is shown in Figure 2 at pipe 25. Assuming the same cavern conditions as in the preceding example excepting that pipe 25 is 10" in diameter and the pipe in the cavern is perforated at 4" intervals with ¾" holes. If a break occurs in the surface connections of such a nature as to equal the total flow capacity of the pipe, the pressure at the top of the pipe will be reduced to near atmospheric. Since the propane vapors in the cavern are under a pressure of 90 p.s.i.g., these vapors will expand rapidly with consequent cooling as they pass through the ¾" holes in pipe 25. If water is pumped into the leaking pipe by means of conduit 32, then the refrigerating effect of the expanding gas will cause the water to freeze and all flow of escaping vapors will cease in about 10 minutes. Obviously this period can be shortened under some circumstances if a rather short ice plug is formed in pipe 25 while in other cases the time may be lengthened somewhat if the ice plug is elongated before complete closure is effected.

Reasonable variation and modification are possible within the scope of the foregoing disclosure, the drawings, and appended claims to the invention the essence of which is that water is supplied in an underground storage system into any conduit in which there has occurred a break above the underground storage cavern or cavity or reservoir to supply at least one of a static head and an ice plug by in situ refrigeration caused by expanding gases and that the system is not limited to the use of water or to the storage of gases as described in connection with the specific example given herein.

I claim:

1. An emergency method for controlling flow of gases from an underground storage of the same under super atmospheric pressure from which said gases can be flowed under normal conditions by way of a conduit leading to the ground surface, which comprises whenever normal control is not exercisable at or near said surface introducing into said conduit at a point substantially below the surface level a fluid in a manner such that it will accumulate in and seal said conduit due to the physical action of said gases against flow of said gases from said reservoir under the conditions prevailing whenever said normal control is not exercisable.

2. An emergency method for controlling flow of hydrocarbon gases from an underground storage of the same, from which said gases can be flowed under normal conditions by way of a conduit to the ground surface, which comprises whenever normal control is not exercisable at or near said surface introducing into said conduit at a point substantially below the surface level a fluid in a manner such that it will accumulate in and seal said conduit due to the physical action of said gases against flow of said gases from said reservoir under the conditions prevailing whenever said normal control is not exercisable.

3. An emergency method for controlling flow of hydrocarbon gases from an underground storage of the same under super atmospheric pressure from which storage of the said gases can be flowed under normal conditions by way of a conduit to the ground surface, which comprises whenever normal control is not exercisable at or near said surface introducing into said conduit at a point substantially below the surface level sufficient water in a manner such that it will accumulate in and seal said conduit due to the physical action of said gases against flow of said gases from said reservoir under the conditions prevailing whenever said normal control is not exercisable and gas flow is substantially greater than any normal operating conditions.

4. An emergency method for shutting off flow of hydrocarbon gases from an underground storage reservoir of the same wherein said gases are normally stored under super atmospheric pressure and from which said gases are escaping through a conduit leading from said reservoir to substantially the ground surface level which comprises introducing into said conduit at a point substantially below the surface level a fluid in a manner such that it will accumulate in and seal said conduit due to the physical action of said gases against the flow of said gases from said reservoir under the conditions prevailing.

5. A method for sealing off in an emergency fashion hydrocarbon gases escaping from an underground reservoir in which said gases are stored under super atmospheric pressure, the said gases undergoing escape through a conduit connecting said reservoir and a point approximately at the ground level, which comprises introducing water into said conduit at a point substantially below the point at which said gases escape from said conduit in a sufficient quantity and in a manner such that it will seal said conduit due to the physical action of said gases against the flow of said gases from said reservoir.

6. An emergency method for shutting off flow of hydrocarbon gases through a conduit leading from an underground storage of the same whenever a normal above or near to ground level shutoff device normally operating in said conduit fails to retain control of said gases which comprises introducing into said conduit below said device a fluid which will freeze and plug said conduit due to the refrigeration effect which obtains when gases are expanding through said conduit in which said shutoff fails to retain control of the flow of said gases.

7. An emergency method for stopping flow of combustible gases escaping from an underground reservoir wherein said gases are present under super atmospheric pressure, when piping, etc., at or near the surface of the ground fails, for some reason, to retain control of the gases in said reservoir which gases then flow toward the ground surface level in an uncontrolled manner, which comprises introducing into and commingling with gases expanding and thus flowing from said reservoir toward said piping, etc., a fluid adapted to freeze and plug the path of flow of said gases under the then prevailing conditions due to the refrigeration effect of said expanding gases.

8. An emergency method for stopping flow of combustible gases escaping from an underground reservoir wherein said gases are present under super atmospheric pressure, when piping, etc., at or near the surface of the ground fails, for some reason, to retain control of the gases in said reservoir which gases then flow toward the ground surface level in an uncontrolled manner, which comprises spraying into and commingling with gases expanding and thus flowing from said reservoir toward said piping, etc., a fluid adapted to freeze and plug the path of flow of said gases under the then prevailing conditions due to the refrigeration effect of said expanding gases.

9. An emergency method for shutting off the flow of a volatile fluid flowing from an underground storage facility upwardly through a conduit, flow through which suddenly becomes uncontrollable by usual flow control means, which comprises while said flow is uncontrollable supplying a sufficient amount of a non-volatile liquid which has a specific gravity greater than said fluid to said conduit at a point thereof substantially at which said fluid enters said conduit from within said facility such that the pressure of the fluid tending to rise will be offset by the vertical height of the column of said liquid supplied into said conduit at said low point and lifted up into said conduit by said pressure.

10. A method for emergency arresting of flow of liquefied hydrocarbon gases from below the liquefied hydrocarbon gases level within an underground storage facility in which said hydrocarbon gases are maintained under superatmospheric presure whenever a break or undesired opening occurs substantially at or near ground level which cannot be readily controlled which comprises feeding to a point in a conduit at which said liquefied hydrocarbon gases, as a liquid, begin their journey up toward the ground level, due to the pressure in the reservoir and to said break, a fluid under conditions and in an amount sufficient to accumulate substantially at the point at which said liquefied gases enter said conduit within said facility a quantity of said fluid sufficient to seal the path of flow of said liquid hydrocarbon gases against flow of the same in said conduit due to the resulting action of said fluid upon said liquefied gases.

11. A method according to claim 10 wherein said fluid is water and said point is the sump of a pump to which said water is supplied and the break is connected with piping and valving normally controlling the supply from said pump at or near ground level.

12. A method according to claim 10 wherein the fluid is water which is injected into a point in a conduit adapted to feeding hydrocarbon gases into said reservoir, said water being injected at a point in said conduit above a spray header located on said conduit whereby the gases expanding through said spray header into said conduit, when a break occurs at or near ground level in said conduit will cause sealing of said conduit by freezing of said water due to the refrigeration effect of the expanding gases.

13. A method for providing an emergency shutoff of gases flowing upwardly and ucontrollably through a path of flow from an underground reservoir of gases which comprises providing in said path of flow substantially below ground level before the emergency condition arises a passageway or restriction of cross section substantially smaller than the remainder of said path of flow the restriction being of such a size relationship to the expected uncontrollable flow of gases that cooling and freezing in said path of flow of a fluid introduced into said path of flow will occur when there is an uncontrollable flow therethrough and when such uncontrollable flow occurs introducing a fluid which will freeze in and plug said path of flow.

14. A method according to claim 13 wherein the gases are hydrocarbon gases and the fluid is water.

15. An underground storage system or reservoir comprising, in combination, a reservoir adapted to contain substantially liquefied petroleum gases, conduit means connecting the inside of said reservoir with a point at or near the surface of the ground, said conduit means being provided for ordinary operation or servicing of the reservoir, means upon said conduit near said point for preventing uncontrolled escape of gases or liquid from the inside of said reservoir through said conduit, a safety sealing fluid supply means, conecting means connecting said safety sealing fluid supply means with a point in said conduit below the ground surface adapted to convey said fluid into said conduit when introduction of said sealing fluid into said conduit is desired and means adapted to place said connecting means into operation whenever there is a failure of said means upon said conduit for preventing uncontrolled escape of gases or liquid from said reservoir.

16. An underground storage system or reservoir comprising, in combination, a reservoir adapted to contain substantially liquefied petroleum gases, conduit means connecting the inside of said reservoir with a point at or near the surface of the ground, said conduit means being provided for ordinary operation or servicing of said reservoir in containing petroleum gas pressure, a safety sealing fluid supply means, connecting means connecting said safety sealing fluid supply means with a point in said conduit below the ground surface adapted to convey said fluid into said conduit when introduction of said sealing fluid into said conduit is desired and means adapted to place said connecting means into operation to permit flow of said safety sealing fluid whenever there is a failure of said conduit means above the point of introduction of said safety sealing fluid.

17. An underground storage cavity adapted to store liquefied petroleum gas, a pipe connecting a relatively high point of said cavity ordinarily above the level of liquid in said cavity with a point substantially at ground level, an orifice in said pipe, a water supply, and a valved pipe connecting said supply to a point in said first-mentioned pipe above said orifice, the said valved pipe and water supply being adapted to place water into said first-mentioned pipe above said orifice in a manner such that the water will flow into said first-mentioned pipe whenever uncontrolled flow therefrom occurs at or near ground level so that the refrigeration effect of the gases expanding through said orifice will cause the formation of an ice-seal in said pipe above said orifice whenever uncontrolled flow therefrom occurs at or near ground level as when said pipe is accidentally broken.

18. Apparatus for controlling flow of gases from an underground storage reservoir of same under super atmospheric pressure comprising a means for leading to the ground surface gases from said reservoir, means for introducing into said means for leading at a point below ground surface a fluid which will seal off said means for leading against uncontrolled flow of said gases and means responsive to uncontrolled flow of said gases in said means for leading for actuating said means for introducing whenever normal control of flow of gases in said means for leading becomes not possible.

References Cited in the file of this patent

UNITED STATES PATENTS

| | | |
|---|---|---|
| 1,877,649 | Dugas | Sept. 13, 1932 |
| 1,882,911 | Richards | Oct. 18, 1932 |
| 2,398,828 | Gray | Apr. 23, 1946 |
| 2,459,227 | Kerr | Jan. 18, 1949 |
| 2,659,209 | Phelps | Nov. 17, 1953 |
| 2,778,199 | Read | Jan. 23, 1957 |
| 2,787,125 | Benz | Apr. 2, 1957 |
| 2,803,114 | Hudson | Aug. 20, 1957 |
| 2,930,197 | Carpenter | Mar. 29, 1960 |

FOREIGN PATENTS

| | | |
|---|---|---|
| 65,619 | Austria | July 10, 1914 |